United States Patent [19]

Merwin et al.

[11] Patent Number: 5,689,230
[45] Date of Patent: Nov. 18, 1997

[54] ENERGY MONITORING AND CONTROL SYSTEM USING REVERSE TRANSMISSION ON AC LINE

[75] Inventors: Jeffrey D. Merwin, Buffalo Grove; Philip D. Gunderson, Arlington Heights; Dennis L. Stephens, Niles; Steven J. Purdy, Lake Zurich, all of Ill.

[73] Assignee: Motoral, Inc., Schamburg, Ill.

[21] Appl. No.: 555,627

[22] Filed: Nov. 9, 1995

[51] Int. Cl.⁶ .................................................. H04M 11/04
[52] U.S. Cl. .............................. 340/310.01; 340/310.02; 340/310.06; 340/825.06; 340/825.69; 340/538
[58] Field of Search .......................... 340/310.01, 310.02, 340/825.69, 825.72, 538, 825.06, 825.07, 310.06

[56] References Cited

U.S. PATENT DOCUMENTS

| | | | |
|---|---|---|---|
| 3,935,505 | 1/1976 | Spiteri | 315/194 |
| 4,904,906 | 2/1990 | Atherton et al. | 315/291 |
| 4,954,768 | 9/1990 | Lauchaco et al. | 323/300 |
| 4,994,718 | 2/1991 | Gordin | 315/240 |
| 5,099,193 | 3/1992 | Moseley et al. | 323/324 |
| 5,237,264 | 8/1993 | Moseley et al. | 323/324 |
| 5,278,536 | 1/1994 | Furtaw et al. | 340/310.01 |
| 5,365,154 | 11/1994 | Schneider et al. | 340/310.01 |
| 5,422,547 | 6/1995 | Brownell | 315/307 |
| 5,455,464 | 10/1995 | Gosling | 340/310.01 |
| 5,475,363 | 12/1995 | Suzuki et al. | 340/310.01 |
| 5,491,463 | 2/1996 | Sargeant et al. | 340/310.01 |

Primary Examiner—Jeffery Hofsass
Assistant Examiner—Timothy Edwards, Jr.
Attorney, Agent, or Firm—Gary J. Cunningham; Kenneth L. Labudda

[57] ABSTRACT

An energy monitoring and control system (10) for use with a conventional AC source (12) having a hot wire and a neutral wire (28). The energy monitoring and control system (10) includes a control station (14) and a number of controllable loads (20). The control station (14) is coupled in series with the hot wire of the AC source and is physically located between the AC source (12) and the loads (20). The individual loads are connected in parallel with each other and are coupled to the AC surce (12) and the control station (14). The control station (14) can communicate with the loads in various ways, a preferred scheme being a power-line communication method. Each of the loads is equipped with circuitry for receiving and executing commands sent by the control station (14). The control station (14) can receive information from the loads (20) by observing the AC supply current drawn by the loads (20).

14 Claims, 2 Drawing Sheets

ENERGY MONITORING AND CONTROL SYSTEM USING REVERSE TRANSMISSION ON AC LINE

FIELD OF THE INVENTION

The present invention relates to the general subject of energy control systems and, in particular, to an energy monitoring and control system in which information about the loads is communicated back to a control station without the need for dedicated transmitters in the loads.

BACKGROUND OF THE INVENTION

Energy monitoring and control systems are widely used in order to achieve sophisticated centralized control of the loads in building electrical systems. The loads typically consist of a vast array of devices and sub-systems, the most prominent of which from an energy consumption standpoint are the components of the heating, cooling, and lighting systems. With the advent of controllable "smart" loads, the recent emphasis upon energy conservation and power utility savings, and the demand for increased effectiveness and reduced cycle time in finding and correcting load problems, energy monitoring and control systems are rapidly becoming a required element of the electrical system in large facilities such as factories, offices, schools, hospitals, and public buildings.

As applied to lighting systems in an office, industrial, or outdoor environment, energy monitoring and control systems offer a number of functional benefits, including the control of a large number of lights, both individually and in groups, from a single location, relatively easy implementation of power conservation strategies, and diagnostic capabilities for promptly detecting the need for maintenance actions such as lamp replacement.

A fundamental aspect of an energy monitoring and control system is the communication method by which a control station and one or more controllable loads communicate with each other. The simplest such approach involves one-way communication between the control station and the loads, in which the control station contains a transmitter and each load includes a receiver. Control commands originate at the control station and are transmitted by appropriate means to one or more loads, which hopefully receive and execute the desired command. As one-way communication implicitly does not provide for transmission of any information from the loads to the control station, the control station has no way of confirming that the desired command was properly received and executed by the desired loads. Furthermore, one-way communication also does not allow the control station to detect problems with the loads themselves, and is therefore unsuited for applications in which load diagnostic capabilities are required.

Two-way communication, on the other hand, allows information to flow both ways between the control station and the loads, thereby allowing the control station to confirm that a control command was indeed properly received and executed. In addition, two-way communication allows for diagnostic information regarding the operating state of the loads to be received and, when appropriate, acted upon by the control station. Existing methods of two-way communication between a control station and a plurality of loads typically require full transceiver capability in both the control station and in each of the loads; that is, in comparison with one-way communication, two-way communication requires the added presence of a transmitter in each of the loads. In addition, many known approaches require additional dedicated communication wiring and/or extensive change in the existing AC power wiring. Both of these disadvantages make existing methods of two-way communication quite costly from both a hardware and an installation standpoint.

It is therefore apparent that an energy monitoring and control system which offers the advantages of two-way communication without requiring a transmitter in each of the loads and which is readily incorporated into existing electrical systems without requiring additional communication wires or changes in the AC wiring would constitute a significant improvement over the prior art.

DETAILED DESCRIPTION OF THE PREFERRED EMBODIMENT

Figure 1:
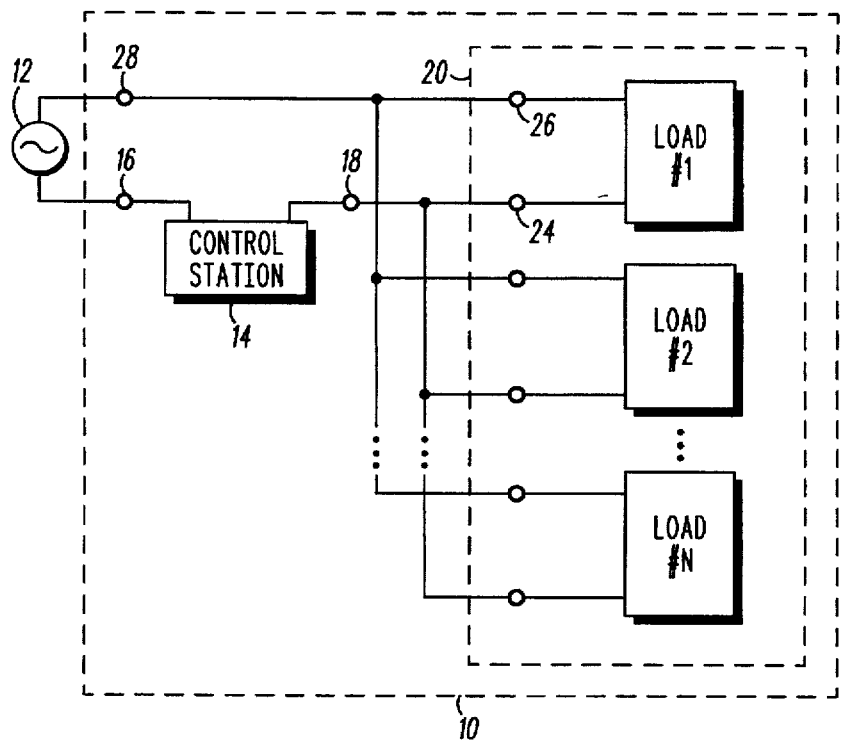
FIG. 1 is a diagram of an energy monitoring and control system, in accordance with the present invention.
Figure 2:
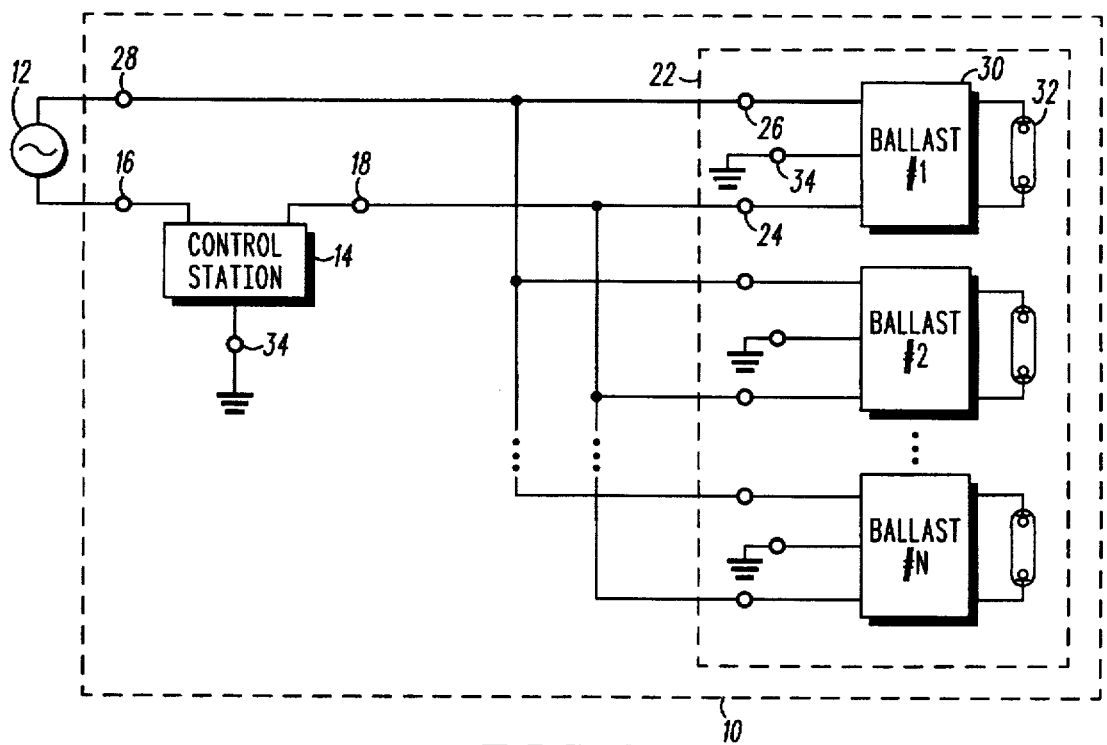
FIG. 2 is a diagram of an energy monitoring and control system which includes controllable electronic ballasts for fluorescent lamps, in accordance with the present invention.

An energy monitoring and control system for use with a conventional alternating current (AC) source having a hot wire and a neutral wire is shown in FIG. 1 and FIG. 2. Referring to FIG. 1, the energy monitoring and control system 10 includes a control station 14 having an input terminal 16 and an output terminal 18, the input terminal 16 being coupled to the hot wire of an AC source 12 and the output terminal 18 being coupled to a plurality of controllable loads 20. The plurality of controllable loads 20 is operable to draw a supply current from AC source 12 and consists of a number of individual loads connected in parallel with each other, each load having a hot connection 24, a neutral connection 26, and an address. The hot connection 24 of each load is coupled to the output terminal 18 of the control station 14, and the neutral connection 26 of each load is coupled to the neutral wire 28 of AC source 12.

The control station 14 and each load are coupled such that the control station 14 is operable to send a control command to at least one address corresponding to a desired load, upon reception of which the desired load executes the control command, resulting in a perceptible change in either the magnitude, the phase, or the harmonic content of the supply current drawn by the loads from AC source 12. The control station 14 includes an interface for accepting user commands and translating user commands into control commands, and a transmitter for sending control commands to the desired loads. Each load includes a receiver for accepting control commands sent by the control station 14, and an execution means for executing control commands sent by the control station 14. In addition, each load is free of a dedicated transmitter circuit for sending information, such as a signal which confirms execution of a control command, to the control station 14. The control station 14 further includes a monitor for monitoring the supply current drawn by the loads, and a comparator for confirming execution of the control commands by comparing the supply current drawn by control commands by comparing the supply current drawn by the loads 20 prior to the sending of a control command with the supply current drawn by the loads 20 after execution of a control command. This system 10 thus allows for two-way communication between the control station 14 and the loads 20, but requires neither additional wires nor the presence of a transmitter in each of the loads.

One embodiment of the present invention which involves control of electronic ballasts for fluorescent lamps is shown in FIG. 2, wherein each load comprises a controllable electronic ballast 30 adapted to light at least one fluorescent lamp 32. In this embodiment, the control station 14 further includes an earth ground terminal 34 which is connected to earth ground. In accordance with conventional safety practices, each ballast also includes an earth ground connection 34 which is connected to earth ground.

Referring again to FIG. 2, the functional operation of the energy monitoring and control system 10 in controlling a particular ballast can be outlined as follows. A user provides a desired control command to control station 14; alternatively, the control station 14, according to a predetermined routine or control logic internal to the control station 14, automatically decides upon a control command to send to the ballast. The command includes the address of the ballast to be controlled, and is sent to the group of ballasts 22 using a predetermined communication method. The command is received, accepted, translated, and executed by the desired ballast, but ignored by all other ballasts. All the while, the control station 14 monitors the supply current; note that such monitoring is not necessarily limited to the magnitude of the supply current, but may also include the phase angle and harmonic content of the supply current as well. If the supply current subsequently changes in accordance with the nature of the control command, then the control station 14 decides that the control command was correctly received and implemented by the ballast; if not, then the control command was either incorrectly received, incorrectly executed, or the ballast and its associated lamps are not operating properly, in which case the control station 14 can either re-transmit the control command or raise a flag (provide a warning signal to an indicator, for example), which informs the user of a possible problem with the ballast and/or its associated lamps.

Control commands, which in a lighting application typically include such functions as turning lights on and off, dimming lights, and causing lights to flash, may be sent by the control station 14 using any of several different methods, including wireless methods such as radio frequency or infrared transmission, and by power-line communication schemes in which the existing AC power wiring is used as a transmission medium.

Figure 3:
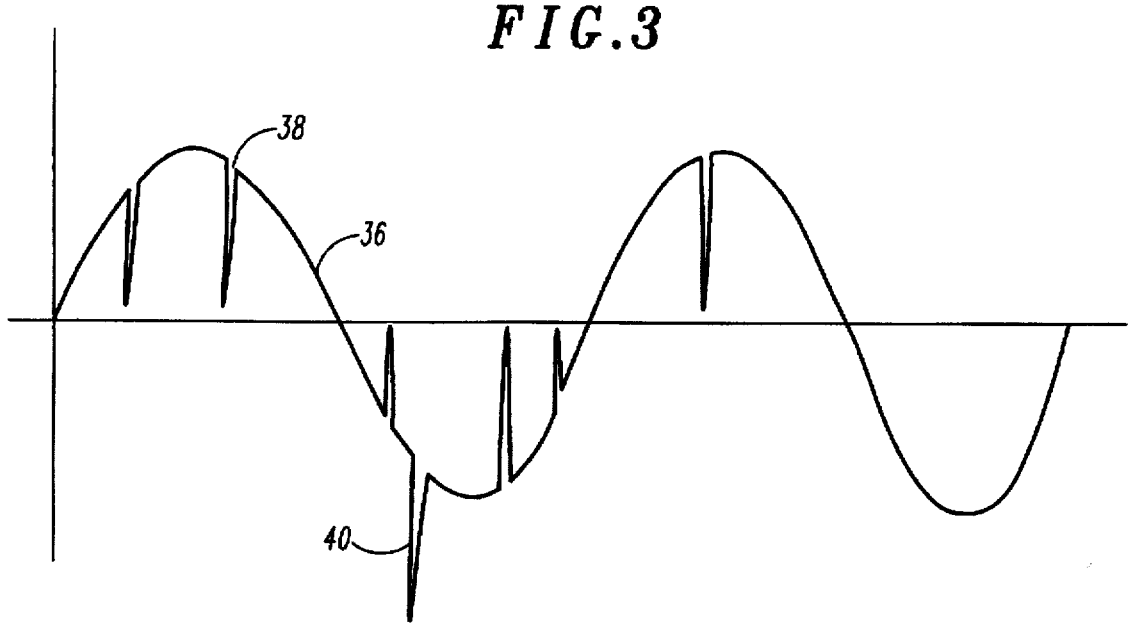
FIG. 3 shows a waveform of the AC voltage supplied to the loads in which depressions are inserted for purposes of power-line communication from a control station to one or more loads, in accordance with the present invention.

In a preferred power-line communication method, the control station 14 can send commands to the ballasts by briefly including a sag 38, depression, or subtractive portion of a voltage waveform, in the ballast supply voltage waveform 36, an example of which is shown in FIG. 3. This method is made possible by the control station 14 being coupled between the AC source 12, the ballasts 22, and earth ground 34. Thus, the power-line communication method may be used to encode information in one or both of the positive and negative halves of the ballast supply voltage waveform. The action of inducing a depression in the supply voltage is repeated according to a predetermined scheme until the entire command is encoded into the supply voltage. The receiver in each ballast is operable to receive the transmitted information and translate it into the corresponding control command. The translated control command is then executed by the desired ballast.

In an alternate embodiment, an additive portion (spike) 40 of the voltage waveform can be used, the sag (subtractive portion) 38 being preferred, because circuits with more simplified constructions can then be used.

In addition to being operable to send a control command which affects only a single ballast, the control station 14 is also capable of sending a master command which effects a predetermined control action in multiple ballasts, one example of which is using a single control command to turn on all the lights in a particular room at essentially the same time, as opposed to going through the effort and time of turning on each ballast in a sequential fashion. Another possible master command in a lighting application might be used to lower the light level in a given office area by a certain amount, which can be achieved either by turning certain ballasts off or by sending a command to all ballasts to reduce the light level of their associated lamps.

While transmission of control commands from the control station 14 to the ballasts 22 may be achieved by way of several different methods, a preferred means by which the ballasts 22 communicate with the control station 14 is by monitoring the control station's AC current supplied to the ballasts 22. For this purpose, in one embodiment, the control station 14 can include a current monitor and a comparator. The current monitor is a way in which the control station 14 monitors the AC line current in terms of its magnitude, phase, or harmonic content, and relays this information for confirmation purposes, by for example, to the comparator. The comparator is a way in which the control station 14 detects a change in the supply current (by a threshold change in either the magnitude, phase, or harmonic content, or any combination thereof), and thereby determines (confirms), whether or not a control command has been properly executed by the ballasts.

System operation can be classified into two modes, operating mode and diagnostic mode. In the operating mode, control commands are sent to a particular ballast or group of ballasts while all other ballasts are operating normally and serving their stated purpose. In a lighting application, the operating mode corresponds to the situation during a typical business day, with some lights on and others off. In the diagnostic mode, all ballasts are turned off, less the one(s) being diagnosed. Hence, the diagnostic mode is suited for periodic inspection and maintenance of the ballasts and fluorescent lamps. For example, in an office lighting application, the diagnostic mode could be used on an "after hours" basis when shutting down all lighting, and cycling through each (load) ballast or group of ballasts to determine whether or not any ballasts and lamps require replacement or closer inspection. After hour diagnostic operation would minimize any inconvenience to office occupants.

A benefit to the system 10 is its simplicity, ease of installation, and cost effectiveness. More specifically, the system 10 provides a cost effective "confirmation scheme," wherein confirmation of an action with a high degree of likelihood is observable by monitoring a threshold change in supply current or voltage, for example. In a preferred embodiment, a robust encoding scheme, such as those which are widely used in digital communications systems, in assigning ballast addresses and transmitting control commands to the ballasts, is included to improve the reliability of the system. In this case, in the undesirable event that a control command is corrupted by communication errors, the chances of false signals providing execution commands to a ballast (load) or group of ballasts (loads) other than that intended, is minimized.

Another consideration in implementing the system 10, relates to the issue of resolution, which is most pronounced when attempting to verify execution of a control command by either one or a relatively small number of ballasts while the system is in the operating mode. The issue of resolution is apparent from the fact that the relative change in the total current supplied by the AC source 12 due to a change in the current drawn by one load is quite small if a large number of loads are operating at the same time. Note that the resolution issue can relate not only to monitoring of the magnitude of the supply current, but also to its phase and harmonic content as well.

To illustrate a potential problem of resolution in greater detail, and to demonstrate how one might arrive at design requirements for sensitivity in a current monitor, comparator, and associated logic, consider the following example. In this example, forty ballasts are to be controlled, and each ballast is initially operating at its full light output setting and drawing one Ampere of current, so that the total current drawn from the AC source is forty Amperes. If a command is sent to one of the ballasts to dim such that its individual current draw is reduced from 1 Ampere to 0.6 Amperes, the resulting decrease in the total current supplied by the AC source will be 0.4 Amperes, and the total current supplied by the AC source will then be reduced to 39.6 Amperes. In order to detect the change which has occurred, the current monitor, comparator, and associated logic in the control station 14 would be designed to at least be sensitive to predetermined threshold changes as small as 0.4 Amperes out of 40 Amperes, or about 1%. The sensitivity requirements could become even more stringent if the number of loads controlled by the control station 14, or the number of possible control functions, is increased.

One of the advantages of the present system 10, is its elimination of the need for a transmitter in each of the ballasts without sacrificing the flow of important information from the ballasts to the control station. This preserves the benefits of two-way communication, while allowing for a much more economical system from a hardware standpoint.

Another advantage of the present system 10 is its elimination of the need for dedicated communication wiring, as communication from the control station to the ballasts (loads) can be achieved by wireless means, the existing AC power lines via a power-line communication scheme, or the like. Still another advantage of the system 10 is that implementation of the system 10 is retrofitable (or requires little or no alteration of the existing AC wiring), thereby greatly enhancing the ease, and significantly reducing the cost, of system installation. The present invention is thus applicable to a variety of AC energy control strategies in which minimal system cost and ease of installation are important requirements.

Although the present invention has been described with reference to a certain preferred embodiment, numerous modifications and variations can be made by those skilled in the art without departing from the novel spirit and scope of this invention.

What is claimed is:

1. An energy monitoring and control system for use with a conventional AC source having at least one phase with a hot wire and a neutral wire, comprising:

a control station having an input terminal and an output terminal, the input terminal being couplable to the hot wire of the AC source and the output terminal being couplable to at least one of a plurality of controllable loads;

each of the plurality of loads having an address and a hot connection and a neutral connection, the hot connection being coupled to the output terminal of the control station, the neutral connection being coupled to the neutral wire of the AC source, the plurality of loads being operable to draw a supply current from the AC source;

the control station and each load being operably coupled such that the control station is operable to send a control command to at least one address corresponding to a desired load, and upon reception of the control command the desired load executes the control command, resulting in a threshold change in the supply current drawn by the loads from the AC source;

the control station including an interface for accepting user commands and translating user commands into control commands, and a transmitter for sending control commands to the desired load;

each load including a receiver for accepting and executing the control commands sent by the control station; and the control station further including a monitor for monitoring a threshold change in the supply current drawn by at least one load, whereby execution of the control command is confirmed.

2. The system of claim 1, wherein each load comprises a controllable electronic ballast adapted to light at least one fluorescent lamp.

3. The system of claim 2, wherein the control station and ballasts are operable to turn the fluorescent lamps on and off.

4. The system of claim 2, wherein the control station and ballasts are operable to vary the illumination level of the fluorescent lamps.

5. The system of claim 1, wherein the control station is operable to transmit a predetermined master command which operably effects a predetermined control action in a designated group of loads that includes at least two of the loads, but without effecting a control action in those loads coupled to the control station that are not part of the designated group of loads.

6. The system of claim 1, wherein the control station further includes means for executing a diagnostic routine for verifying proper operation of each load.

7. The system of claim 1, wherein the control station further includes an earth ground terminal connected to earth ground.

8. An energy monitoring and control system for use with a conventional AC source having at least one phase with a hot wire and a neutral wire, comprising:

a control station having an input terminal and an output terminal, the input terminal being couplable to the hot wire of the AC source, and the output terminal being couplable to at least one of a plurality of controllable loads;

each of the loads having an address and a hot connection and a neutral connection, the hot connection being coupled to the output terminal of the control station, and the neutral connection being coupled to the neutral wire of the AC source, the plurality of loads being operable to draw a supply current from the AC source;

the control station and each load being operably coupled such that;

(i) the control station is operable to send control commands to a desired load or a desired group of loads without affecting the other loads that are coupled to the control station;

(ii) the control station transmits control commands to the loads by inducing at least one of a depression and a spike in the voltage supplied by the AC source to the loads in a predetermined sequential fashion; and (iii) following reception of a control command, the desired load executes the control command, resulting in a change in the supply current drawn by the loads from the AC source;

each load including a receiver for accepting and executing control commands sent by the control station;

the control station further including a monitor for monitoring the supply current and a comparator for confirming execution of the control commands by comparing the supply current drawn by the loads prior to the sending of a control command with the supply current drawn by the loads after execution of the control commands, the monitor and comparator thus providing a reverse transmission scheme in which information about the loads is communicated back to the control station without the need for dedicated transmitter circuits in each of the loads.

9. An energy monitoring and control system for use with a conventional AC source having at least one phase with a hot wire and a neutral wire, comprising:

a control station having an input terminal and an output terminal, the input terminal being coupled to the hot wire of the AC source and the output terminal being coupled to at least one of a plurality of controllable electronic ballasts, each ballast being adapted to light at least one fluorescent lamp;

the plurality of ballasts adapted to be connected in parallel with each other and to the AC source, each ballast having an address, a hot connection, a neutral connection, and an earth ground connection, the hot connection being coupled to the output terminal of the control station, the neutral connection being coupled to the neutral wire of the AC source, and the earth ground connection being connected to earth ground, the plurality of ballasts being operable to draw a supply current from the AC source;

the control station and each ballast being coupled such that the control station is operable to send a control command to at least one address corresponding to a desired ballast, upon reception of which the desired ballast executes the control command, resulting in a perceptible change in the supply current drawn by the ballasts from the AC source;

the control station including an interface for accepting and translating user commands into control commands, and a transmitter for sending control commands to the desired ballasts;

each ballast including a receiver for accepting control commands sent by the control station and an execution means for executing control commands sent by the control station, each ballast being free of a dedicated transmitter circuit for sending to the control station a signal confirming execution of a control command; and the control station further including a monitor for monitoring the supply current drawn by the ballasts and a comparator for confirming execution of the control command by comparing the supply current drawn by the ballasts prior to the sending of a control command with the supply current drawn by the ballasts after execution of the control command.

10. The system of claim 9, wherein the control station transmits control commands to the ballasts by inducing at least one of a depression and a spike in the voltage supplied by the AC source to the ballasts in a predetermined sequential fashion.

11. The system of claim 9, wherein the control station is operable to transmit a predetermined master command that effects a predetermined control action in a designated group of ballasts that includes at least two of the ballasts, but without effecting a control action in those ballasts coupled to the control station that are not part of the designated group of ballasts.

12. The system of claim 9, wherein the control station further includes means for executing a diagnostic routine for verifying proper operation of each ballast.

13. The system of claim 9, wherein the control station further includes an earth ground terminal connected to earth ground.

14. An energy monitoring and control system for use with a conventional AC source having a hot wire and a neutral wire, comprising:

a control station having an input terminal, an earth ground terminal, and an output terminal, the input terminal being coupled to the hot wire of the AC source, the earth ground terminal being connected to earth ground, and the output terminal being coupled to a plurality of controllable electronic ballasts, each ballast being adapted to light at least one fluorescent lamp;

the plurality of ballasts adapted to being connected in parallel with each other and to the AC source, each ballast having an address, a hot connection, a neutral connection, and an earth ground connection, the hot connection being coupled to the output terminal of the control station, the neutral connection being coupled to the neutral wire of the AC source, and the earth ground connection being connected to earth ground, the plurality of ballasts being operable to draw a supply current from the AC source;

the control station and each ballast being coupled such that the control station is operable to send a control command to at least one address corresponding to a desired ballast, upon reception of which the desired ballast executes the control command, resulting in a perceptible change in the supply current drawn by the plurality of ballasts from the AC source;

the control station including:

an interface for accepting and translating user commands into control commands; and a transmitter for sending control commands to the desired ballasts by means of a power-line communication scheme wherein the existing AC power wires serve as a transmission medium and the control station transmits control commands to the ballasts by inducing a depression in the voltage supplied by the AC source to the ballasts in a predetermined sequential fashion;

each ballast including a receiver for accepting control commands sent by the control station and an execution means for executing control commands sent by the control station;

the control station further including a monitor for monitoring the current drawn by the plurality of ballasts and a comparator for confirming execution of the control command by comparing the supply current drawn by the ballasts prior to the sending of a control command with the supply current drawn by the ballasts after execution of the control command; and the control station being further operable to transmit at least one predetermined master command that effects a predetermined control action in a designated group of ballasts that includes at least two of the ballasts, but that does not effect a control action in those ballasts coupled to the control station that are not part of the designated group of ballasts.

* * * * *